April 21, 1959 R. G. NYE 2,883,446

PROTECTIVE SHIELDS FOR ELECTRONIC DEVICES

Filed Nov. 18, 1954 2 Sheets-Sheet 1

INVENTOR.
ROBERT GLEN NYE
BY
George E. Pearson
ATTORNEYS

INVENTOR.
ROBERT GLEN NYE
BY
George E. Pearson
ATTORNEYS 2,883,446

PROTECTIVE SHIELDS FOR ELECTRONIC DEVICES

Robert Glen Nye, San Diego, Calif.

Application November 18, 1954, Serial No. 469,868

5 Claims. (Cl. 174—35)

(Granted under Title 35, U.S. Code (1952), sec. 266)

The invention described herein may be manufactured and used by or for the Government of the United States of America for governmental purposes without the payment of any royalties thereon or therefor.

This invention relates primarily but is not limited to electron control tubes, control devices in the field of solid state physics, and combinations of circuitry relating to either or both in combination. More specifically the invention is directed to improvements in protective shielding means for use with such devices.

In these devices, particularly as physical size is reduced, dissipation of heat becomes a major factor; further, because such devices are largely of a plug-in or other rapidly replaceable construction, secure mounting and space for hardware related thereto becomes a major factor. Both of these problems are increasingly difficult of solution under conditions of severe shock and vibration. In all cases, the normal problems of circuit shielding are present and complicate the solution of the previously mentioned problems.

An object of this invention is to provide new and improved heat exchange systems for electron devices of the aforedescribed type.

Another object of this invention is to provide protective means for electron control devices, circuit elements or combinations thereof affording a great number of evenly distributed points of contact for the transfer of heat therefrom by conduction.

Another object is to provide an essentially continuous path for the flow of heat from the protected device into the parent equipment, a heat sink, or other means of disposing of internally generated heat.

Another object is to surround the protected device with a greatly increased radiating surface for increased dissipation of heat by radiation and by conduction into surrounding air.

Another object is to provide an electron control device, circuit element, or combination thereof with a self-adjusting structure which will provide rigid support to the protected device in the event of the application of severe shocks.

Another object is to provide the protected device with a protective surface of high friction damping in the event of being subjected to severe vibrations.

Another object is to provide the protected device with effective electrostatic shielding from other circuit elements.

A further object is to devise a means for accomplishing the above objects in a simple and inexpensive, yet effective manner.

The foregoing and other objects of the invention will be best understood from the following descriptions encompassing but not limited to two (2) general types, viz., (I) self-supporting types and (II) types intended as sub-assemblies to more elaborate enclosures. Figs. 1 through 5 describe type (I) and Figs. 6 and 7 describe type (II). More specifically:

Figure 1:
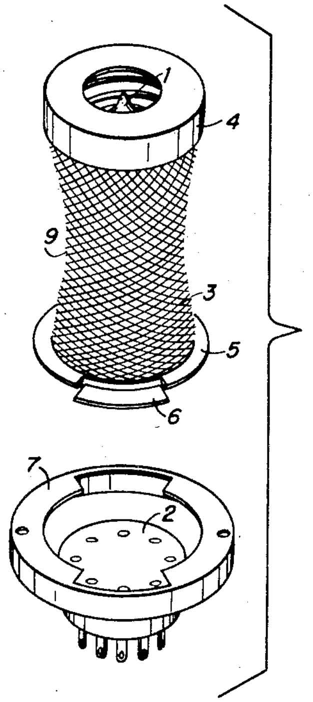
Fig. 1 is an exploded view of a shielded tube and mounting base therefor.
Figure 2:
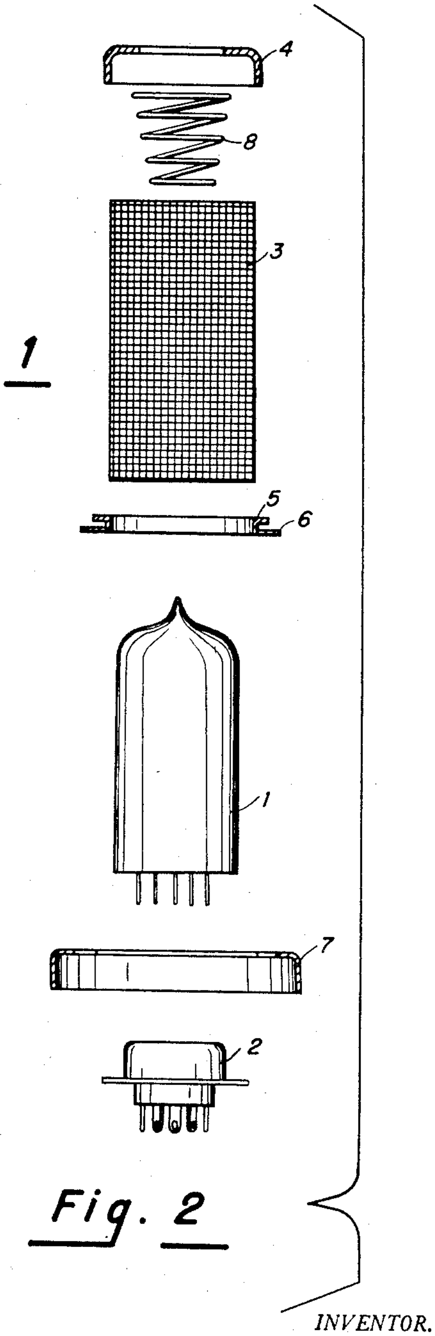
Fig. 2 is an exploded view of the structure of Fig. 1 showing further details of construction.

Drawings referring to type (I) aforementioned, show a circuit element comprising an electron tube 1 which plugs into a socket 2 in a conventional manner. Enclosing the circuit element is a sleeve of woven wire 3 which is soldered, welded, cemented or otherwise affixed to a ferrule 4 and a locking ring 5 having means 6 for mating with an apertured base retaining ring 7 concentric with the socket 2 and affixed as by screws (not shown), to a parent equipment of which this invention and the circuit element are presumed to be a part. A spring 8 serves the dual purpose of holding the circuit element 1 or 1*a* in its socket 2 and maintaining tension on the woven wire sleeve 3.

The intended functions of the invention in the form thus far described are performed as follows. The circuit element 1 is plugged into its socket 2 in a conventional manner. Assembly 3—4—5—6—8 is slipped over the circuit element 1 and mated with its retainer 7. The spring 8 creates tension on the woven wire sleeving 3 causing it to contract as indicated at 9 and grip the circuit element 1 creating an extremely rigid structure, highly resistant to shock and vibration due to frictional forces within to woven wire sleeving 3. A further effect is that the woven wire sleeve 3 adjusts itself to the physical configuration of the circuit element creating a great number of point contacts for rapid and even absorption of heat which finds outlet into the parent equipment for dissipation through locking ring 5, mating means 6 and retainer 7. The flow of heat is further facilitated by physical contact between mating means 6 and retainer ring 5 being kept under tension by the spring 8.

Figure 3:
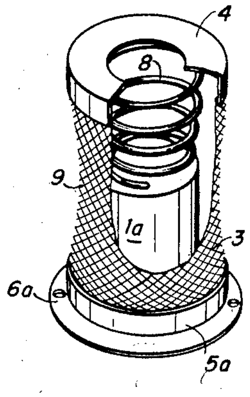
Fig. 3 is a view of a shielded packaged electronic circuit and mounting base therefor with parts broken away to illustrate the function of the retaining and tensioning spring.
Figure 5:
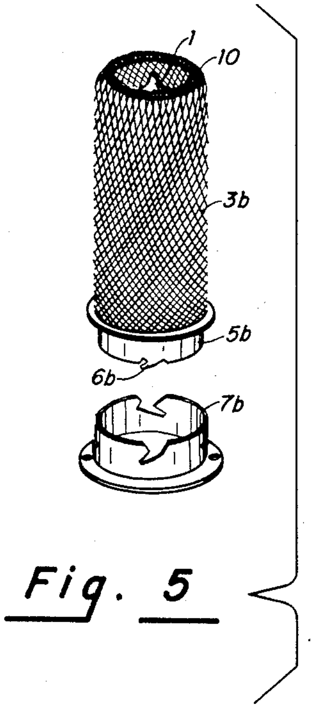
Fig. 5 is an exploded view of a shielded tube and mounting base therefor in which the shield also functions as a tube retaining spring.
Figure 4:
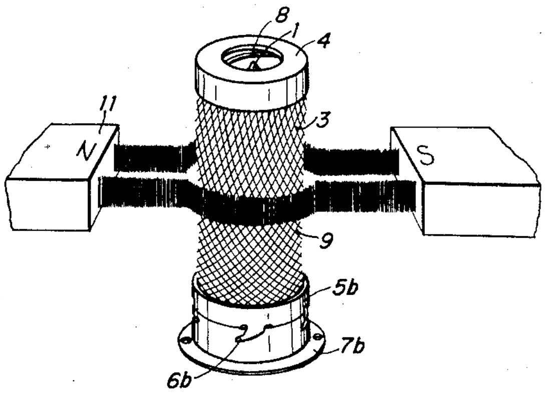
Fig. 4 is a view illustrating a different mounting base arrangement for the shielded tube structure of Fig. 1 and further illustrating magnetic field effects.

In Fig. 3, wherein a transistor or package circuit 1*a* is plugged into a socket 2 (not shown), the base ring 5*a* is apertured to receive screws (not shown) for fastening to the parent equipment. In Figs. 4 and 5, the locking and base rings 5*b* and 7*b* respectively employ an alternative form of mating means 6*b* for locking engagement therebetween. A variation in sleeve structure of type (I) devices is shown in Fig. 5 and comprises a sleeve of woven spring wire 3*b* with one end folded as indicated at 10 or otherwise protected against unraveling in a manner to allow freedom of motion, said sleeve being affixed to a mounting ferrule 5*b* as hereinbefore described, the whole being constructed and arranged so that said woven sleeve 3*b* is self-elongating and therefore self-conforming to the configuration of the protected element 1.

Drawings referring to devices of type (II), aforementioned, employ a ferrule 4*a* having a flange 12 which retains an external concentric spring 13, said spring 13 being also retained by a flange 14 on a second ferrule 4*b*, said second ferrule 4*b* being affixed to the opposite end of said woven wire sleeve 3, the whole being constructed and arranged to be self-elongating and self-conforming to the configuration of said protected element 1.

Figure 6:
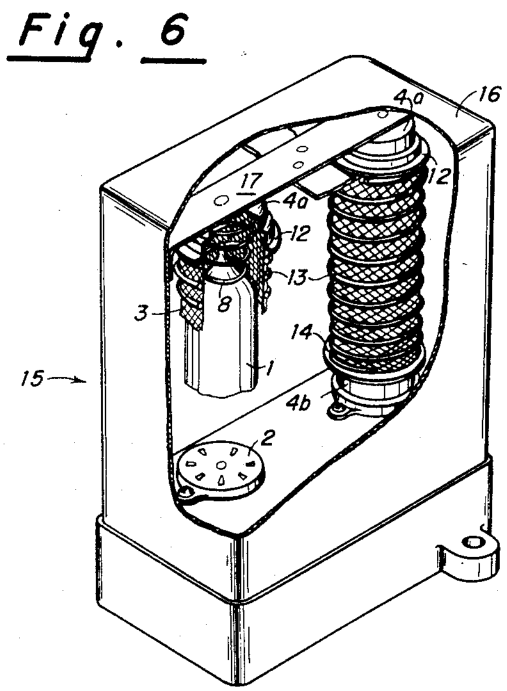
Figs. 6 and 7 respectively illustrate different standard circuit enclosure applications of a tube and shield structure compression spring for maintaining the shield under tension.

In a typical application shown in Fig. 6, a standard electronic circuit enclosure 15 is provided with a removable cover 16 in which a vacuum tube or circuit sub-assembly 1 is affixed by means of being plugged in to a socket 2. The removable cover 16 is provided with one or more type (II) shield assemblies which are secured to the bracket 17, in turn, secured to the cover 16. When the cover 16 is installed, these assemblies slip over the protected circuit element 1. The elongation of the woven wire sleeve 3 causes it to conform to the protected element 1 providing rigid protection against shock and vibration, electrostatic shielding from other circuit elements which may be within said enclosure 15 and provides conduction of heat generated by the protected element 1 by physical conduction through the wire sleeve 3, through the ferrule 4*a*, into the cover 16 of the enclosure 15 where said heat is disposed of by radiation into the surrounding environment or by conduction into a parent equipment of which the enclosure is presumed to be a part.

Figure 7:
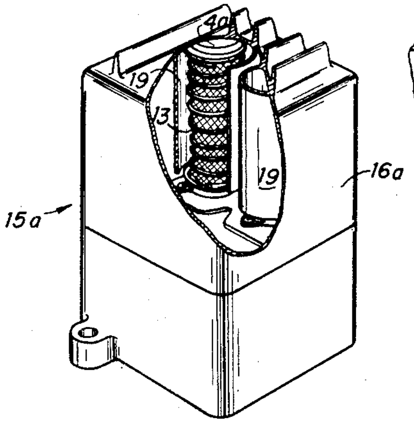

In a second typical application shown in Fig. 7, an alternative type of standard circuit enclosure 15*a* is provided with a removable cover 16*a* having wells 19 for electrostatically shielding a protected circuit element 1. Each well 19 encloses a type (II) shield assembly which provides protection against shock and vibration to the protected circuit element 1 and conduction of heat from the circuit element 1 into the cover 16*a* in a manner as hereinbefore described.

Another typical application of either type (I) or type (II) shields is illustrated in Fig. 6 wherein the shield 3 is constructed of ferromagnetic material and provides environmental control of magnetic fields relating to the protected element in addition to other benefits hereinbefore described, the control being that, if the material be of low magnetic retentivity and high permeability, magnetic lines of force from either a fixed or alternating source 11 are conducted around the protected element 1 through the material comprising the shield 3, 4, 5, but if the material be of high magnetic retentivity the shield will retain said magnetic field and thus provide the protected element with a fixed magnetic field of desired orientation and polarity according to the manner desired at time of fabrication and magnetization of the protective shield.

*Definitions*

The terms "protected element" or "protected device" as hereinbefore and hereinafter used shall be construed in meaning to interchangeably include but not be limited to electron tubes, transistors, electronic circuit assemblies or combinations thereof.

The term "wire" shall be construed as meaning filaments of either metallic or non-metallic material according to the particular application to which the subject invention may be applied.

The term "sleeve" as used herein and illustrated for convenience in cylindrical form shall not be limited to such shape inasmuch as the principles involved adapt for designs of diverse shapes and shall be construed to include cylindrical forms, rectangular and such other configuration as are appropriate to the particular application.

Obviously many modifications and variations of the present invention are possible in the light of the above teachings. It is therefore to be understood that within the scope of the appended claims the invention may be practiced otherwise than as specifically described.

What is claimed is:

1. In an electronic assembly including a heat generating electronic component mounted in a supporting structure, protective means for dissipating the heat of said component and mechanically and electrically shielding said component, said protective means comprising a thermally and electrically conductive sleeve of woven filaments in surrounding heat conductive contact with said component, means for detachably securing said sleeve under tension to said structure and to a portion of said component remote from said structure whereby said component is resiliently urged toward said structure and a conductive path is provided from said component through said sleeve to said structure, said securing means including a resilient element compressedly mounted within said sleeve between one end thereof and the end of said component remote from said structure.

2. The device of claim 1 wherein said securing means further includes mating connecting means on one end of said sleeve and said structure, said sleeve having a diameter in unstressed condition slightly greater than the perimeter of said component, whereby said sleeve will firmly contact the peripheral surface of said component when said sleeve is placed under tension.

3. A shielded electronic assembly comprising an electron discharge device and a mounting structure therefor, a thermally conductive tubular sleeve of woven filaments surrounding said device and detachably secured in heat conducting contact with said device and said structure, and spring means compressedly mounted between one end of said device and a corresponding end of said sleeve for tensioning said sleeve and urging said device toward said structure.

4. The assembly of claim 3 wherein said structure includes a base and a heat radiating cover secured thereto, and means for conducting heat from said sleeve to said cover.

5. The assembly of claim 4 wherein said last mentioned means comprises a ferrule mounted in heat conductive contact with said sleeve and cover.

References Cited in the file of this patent

UNITED STATES PATENTS

| | | |
|---|---|---|
| 1,564,694 | Lerchen | Dec. 8, 1925 |
| 2,108,635 | Aiken et al. | Feb. 15, 1938 |
| 2,434,358 | Frank | Jan. 13, 1948 |
| 2,522,072 | Tierney | Sept. 12 ,1950 |
| 2,715,518 | Bickler | Aug. 16, 1955 |

FOREIGN PATENTS

| | | |
|---|---|---|
| 390,500 | Great Britain | Apr. 4, 1933 |